(12) United States Patent  
Tseng

(10) Patent No.: US 9,039,236 B2  
(45) Date of Patent: May 26, 2015

(54) OPTICAL LENS AND LIGHT SOURCE MODULE HAVING THE SAME

(71) Applicant: HON HAI PRECISION INDUSTRY CO., LTD., New Taipei (TW)

(72) Inventor: Yung-Chang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 172 days.

(21) Appl. No.: 13/726,240

(22) Filed: Dec. 24, 2012

(65) Prior Publication Data

US 2014/0119018 A1 May 1, 2014

(30) Foreign Application Priority Data

Oct. 29, 2012 (TW) .............................. 101139874 A

(51) Int. Cl.
*F21S 8/00* (2006.01)
*F21V 5/04* (2006.01)
*G02B 19/00* (2006.01)
*F21Y 101/02* (2006.01)

(52) U.S. Cl.
CPC .............. *F21V 5/04* (2013.01); *F21Y 2101/02* (2013.01); *G02B 19/0009* (2013.01); *G02B 19/0061* (2013.01)

(58) Field of Classification Search
CPC ........................................................ G02B 3/00
USPC .......................................................... 362/268
See application file for complete search history.

(56) References Cited

U.S. PATENT DOCUMENTS

2008/0303757 A1\* 12/2008 Ohkawa et al. ................. 345/82  
2010/0208167 A1\* 8/2010 Kimura et al. .................. 349/64  
2011/0116272 A1\* 5/2011 Bak et al. ................. 362/296.01

\* cited by examiner

*Primary Examiner* — Anh Mai  
*Assistant Examiner* — Hana Featherly  
(74) *Attorney, Agent, or Firm* — Novak Druce Connolly Bove + Quigg LLP

(57) ABSTRACT

A lens for diverging light includes a bottom surface, a recess defined in the bottom surface, a lower inner curved surface in the recess, and an upper outer curved surface. The lower inner curved surface is configured for receiving light emitted from a light source. The lower inner curved surface includes an inwardly curved lower portion adjacent to the bottom surface, a flat surface portion arranged at a center of a bottom in the recess, and an inwardly curved intermediate portion connected between the lower portion and the flat surface portion. The upper outer curved surface faces away from the bottom surface.

17 Claims, 3 Drawing Sheets

OPTICAL LENS AND LIGHT SOURCE MODULE HAVING THE SAME

BACKGROUND

1. Technical Field

The present disclosure generally relates to optical devices, and particularly to an optical lens and a light source module which has the optical lens.

2. Description of Related Art

In recent years, thanks to excellent light quality and high luminous efficiency, light emitting diodes (LEDs) have increasingly been used as substitutes for incandescent bulbs, compact fluorescent lamps and fluorescent tubes as light sources of illumination devices.

Generally, a conventional light source module includes a lens arranged above the light source to adjust an angular distribution of the light radiated from the light source. A conventional lens includes two curved surfaces, respectively designated as a small curved surface adjacent to the light source and a big curved surface away from the light source. The big curved surface covers the small curved surface therein. A top portion of the small curved surface away from the light source is configured tine-shaped to diverge light radiated from the light source from a center portion to lateral sides of the lens, thereby decreasing a light intensity at the center portion of the lens. However, a curvature of the top portion is so great that the tined top portion is hard to form, which undesirably results in a complex manufacturing.

Therefore, it is necessary to provide an optical lens and a light source module having the optical lens to overcome the above-mentioned shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe an exemplary embodiment of the present optical lens and the light source module having the same.

Figure 1:
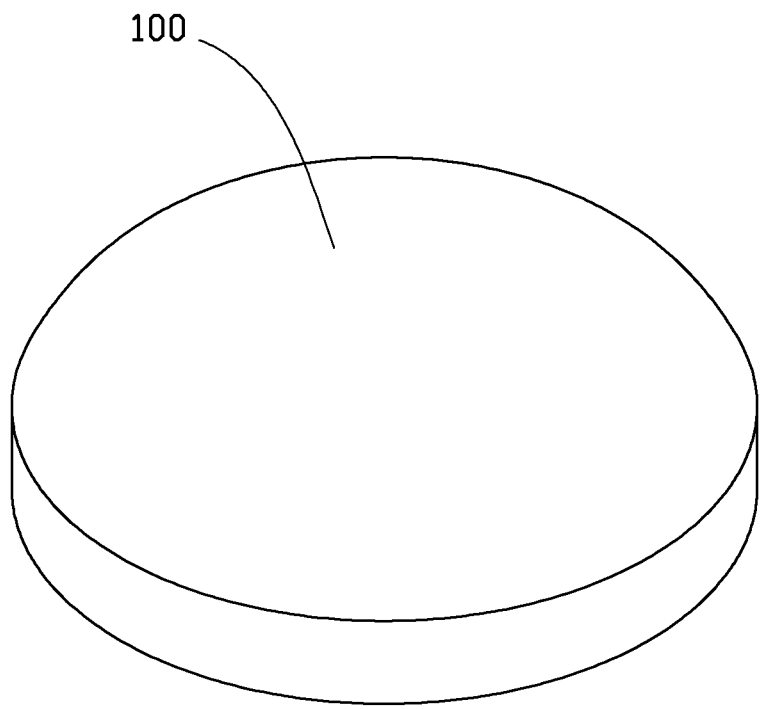
FIG. 1 is a schematic, isometric view of an optical lens in accordance with an exemplary embodiment of the present disclosure.
Figure 2:
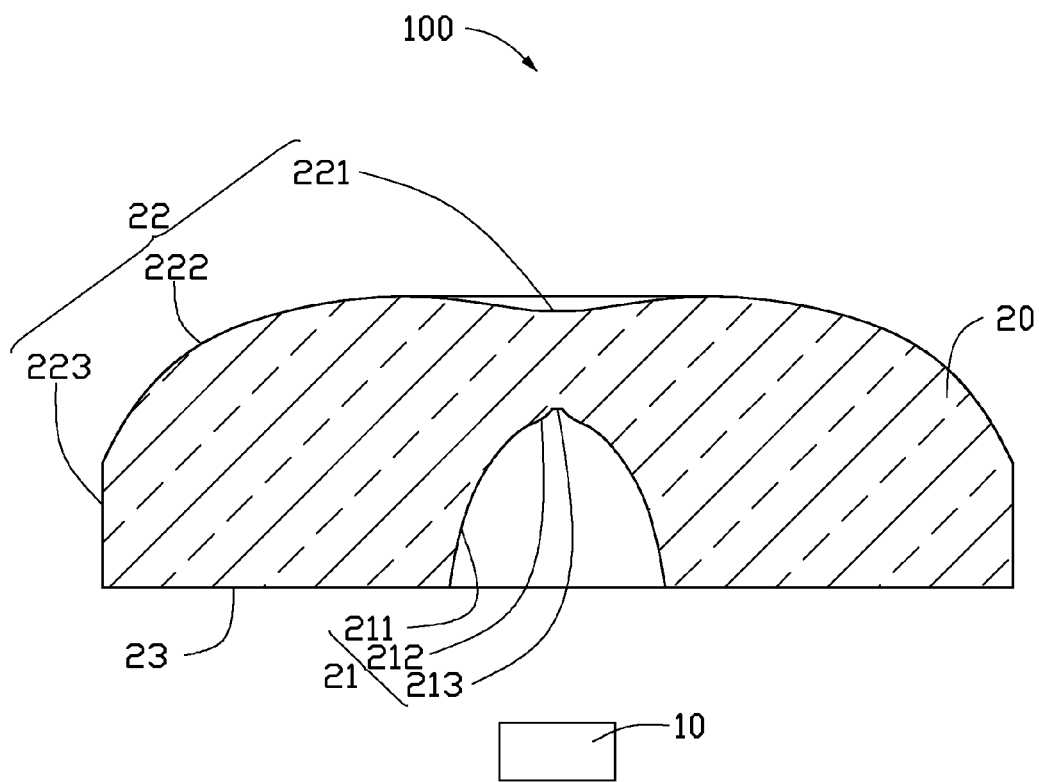
FIG. 2 is a cross-sectional view of a light source device having the optical lens of FIG. 1 and a light source, in accordance with an exemplary embodiment of the present disclosure and taken along line II-II of FIG. 1.
Figure 3:
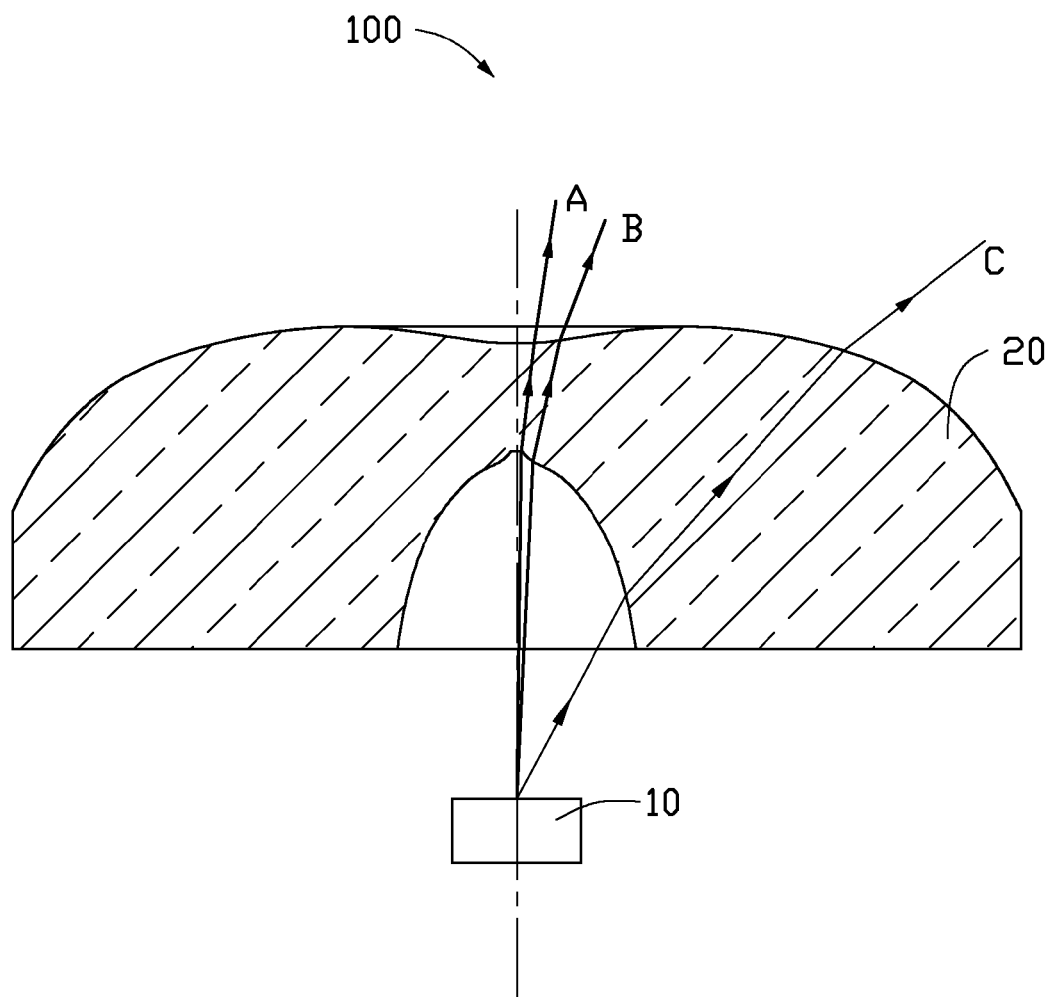
FIG. 3 is a light path diagram of the light source device of FIG. 2.

Referring to FIGS. 1 and 2, a light source module 100, in accordance with an exemplary embodiment of the present disclosure, includes a light source 10 and an optical lens 20 located on the light source 10. In this embodiment, the light source 10 is an LED.

The lens 20 includes a bottom surface 23 and a recess 24 defined in the bottom surface 23. The recess 24 has a lower inner curved surface 21 configured for receiving light emitted from the light source 10. The lower inner curved surface 21 includes an inwardly curved lower portion 211 adjacent to the bottom surface 23, a flat surface portion 213 arranged at a center of a bottom in the recess 24, and an inwardly curved intermediate portion 212 connected between the bottom portion 211 and the flat surface portion 213.

The lower inner curved surface 21 covers the light source 10, to function as a light inputting surface of the lens 20. The lower portion 211 is curved and annular, and recesses upwardly towards an interior of the lens 20 from the bottom surface 23. The lower portion 211 is adjacent to the light source 10. In this embodiment, a contour profile of the lower portion 211 is substantially semi-ellipsoidal. The intermediate portion 212 smoothly connects the lower portion 211. The intermediate portion 212 is also curved and annular, and further recesses upwardly towards the interior of the lens 20 from a top of the lower portion 211. A curvature of the cross-section of the lower portion 211 decreases along a direction from the bottom surface 23 to the intermediate portion 212. A curvature of the cross-section of the intermediate portion 212 increases along a direction from the lower portion 211 to the flat surface portion 213. In other words, an opening of the lower portion 211 is getting smaller upwardly from the bottom surface 23 to the intermediate portion 212, i.e. along a direction of an optical axis of the lens 20, first steeply and then flatly. An opening of the intermediate portion 212 is getting smaller upwardly from the top of the lower portion 211 to the flat surface portion 213, i.e. along the direction of the optical axis of the lens 100, first flatly and then steeply.

The flat surface portion 213 is formed at a top centre of the intermediate portion 212. That is, the intermediate portion 212 recesses from the top centre of the lower portion 211 upwardly for a distance, and the flat surface portion 213 extends horizontally above the lower portion 211 and the intermediate portion 212. In this embodiment, the flat surface portion 213 is parallel to the bottom surface 23 and faces the light source 10. A top view of the flat surface portion 213 is substantially round, and with a small radius. A bottom periphery of the lower inner curved surface 21 intersects the bottom surface 23. In other words, a bottom edge of the lower portion 211 is configured on the bottom surface 23. The lower portion 211 and the intermediate portion 212 are used for diverging light radiated from the light source 10. When the light radiated from the light source 10 strikes on the lower inner curved surface 21, only a little of the light at a center portion travels through the flat surface portion 213 and strikes on the upper outer curved surface 22 directly. Most part of the light will travel through the intermediate portion 212 and the lower portion 211, and be refracted and diverged from the center portion to lateral sides of the lens 20.

The upper outer curved surface 22 is positioned above the lower inner curved surface 21 and opposite to the first cured surface 21, to function as a light outputting surface of the lens 20. The upper outer curved surface 22 includes a concave surface 221 at a top center portion of the lens 20, and an arcuate surface 222 at an outer periphery of the concave surface 221. The lens 20 has a cylindrical side surface 223 connected between the arcuate surface 222 and the connection surface 23. The concave surface 221 faces the flat surface portion 213 of the lower inner curved surface 21. The arcuate surface 222 interconnects the concave surface 221 and the annual side surface 223. The concave surface 221 can be a concave circle surface recessed downwardly into the lens 20 to further diverge the light traveling through the concave surface 221. The arcuate surface 222 protrudes upwardly away from the light source 10. A radius of curvature of the arcuate surface 222 is greater than that of the concave surface 221. Bottom periphery sides of both the first and upper outer curved surfaces 21, 22 are configured on the bottom surface 23 and interconnected by the bottom surface 23.

The bottom surface 23 is adjacent to the light source 10 and interconnects the lower inner curved surface and upper outer curved surfaces 21, 22.

When light radiated from the light source 10 passes through the lens 20, the light firstly strikes on the lower inner curved surface 21, and the light is refracted by the lower portion 211, the intermediate portion 212, and the flat surface portion 213, respectively. Light A is a light beam striking onto the flat surface portion 213 of the lower inner curved surface 21. A beam of the light A at the center portion travels through the flat surface portion 213 and strikes on the upper outer curved surface 22 directly, and then is diverged to the lateral sides of the lens 20 by the concave surface 221 of the second surface 22, because the flat surface portion 213 is small and positioned at the center portion of the lower inner curved surface 21. The other part of the light (designated as light B and light C) at periphery sides of the light A strikes on the intermediate portion 212 and the lower portion 211, respectively. The light B strikes on the intermediate portion 212 and travels to the arcuate surface 222 of the second surface 22, and then is diverged to the lateral sides of the lens 20 apparently, because the curvature of the intermediate portion 212 increases upwardly along a direction from the lower portion 211 to the intermediate portion 212. The light C strikes on the lower portion 211 and travels to the arcuate surface 222 of the second surface 22, and then is diverged to the lateral sides of the lens 20. Thus, the light is refracted by the lower inner curved surface 21 and the upper outer curved surface 22 to lateral directions to increase outputting angles of the light and distribute the light evenly.

In the present disclosure, the flat surface portion 213 is formed at the top center of the intermediate portion 212 instead of a tine-shaped portion formed thereat, which makes the lower inner curved surface 21 easy to form. Further, the flat surface portion 213 is small which will not influence the light to be diverged from the center portion to lateral sides of the lens 20, but still achieve an even light distribution macroscopically.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A lens for diverging light, comprising:
a bottom surface;
a recess defined in the bottom surface;
a lower inner curved surface in the recess, the lower inner curved surface configured for receiving light emitted from a light source, the lower inner curved surface comprising an inwardly curved lower portion adjacent to the bottom surface, a flat surface portion arranged at a center of a bottom in the recess, and an inwardly curved intermediate portion connected between the lower portion and the flat surface portion; and
an upper outer curved surface facing away from the bottom surface;
wherein the inwardly curved lower portion protrudes towards the upper outer curved surface, and the inwardly curved intermediate portion protrudes towards the bottom surface.

2. The lens of claim 1, wherein a curvature of the lower portion gradually decreases along a direction from the bottom surface to the intermediate portion.

3. The lens of claim 2, wherein a curvature of the intermediate portion gradually increases along a direction from the lower portion to the flat surface portion.

4. The lens of claim 1, wherein the lower portion is substantially semi-ellipsoidal.

5. The lens of claim 1, wherein the flat surface portion is parallel to the bottom surface.

6. The lens of claim 5, wherein the flat surface portion is round.

7. The lens of claim 1, wherein the upper outer curved surface comprises a concave surface at a top center portion of the lens, an arcuate surface surrounding the concave surface.

8. The lens of claim 7, wherein the concave surface is aligned with the recess.

9. The lens of claim 8, wherein the arcuate surface is an outwardly curved surface.

10. The lens of claim 9, wherein a radius of curvature of the arcuate surface is greater than that of the concave surface.

11. A light source module comprising:
a light source; and
a lens including:
a bottom surface;
a recess defined in the bottom surface facing the light source;
a lower inner curved surface in the recess, the lower inner curved surface configured for receiving light emitted from the light source, the lower inner curved surface comprising an inwardly curved lower portion adjacent to the bottom surface, a flat surface portion arranged at a center of a bottom in the recess, and an inwardly curved intermediate portion connected between the lower portion and the flat surface portion; and
an upper outer curved surface facing away from the bottom surface for emitting light;
wherein the inwardly curved lower portion protrudes towards the upper outer curved surface, and the inwardly curved intermediate portion protrudes towards the bottom surface.

12. The light source module of claim 11, wherein the light source is an LED light source.

13. The lens of claim 11, wherein the flat surface portion is parallel to the bottom surface.

14. The lens of claim 11, wherein the flat surface portion is round.

15. The lens of claim 11, wherein the upper outer curved surface comprises a central concave surface at a top center portion of the lens, and an arcuate surface at an outer periphery of the concave surface.

16. A lens for diverging light, comprising:
a bottom surface;
a recess defined in the bottom surface;
a lower inner curved surface in the recess, the lower inner curved surface comprising an inwardly curved lower portion adjacent to the bottom surface, a flat surface portion arranged at a center of a bottom in the recess, and an outwardly curved intermediate portion connected between the lower portion and the flat surface portion;
an upper outer light emitting curved surface facing away from the bottom surface, the upper outer curved surface comprising a central concave surface aligned with the recess, a convex peripheral surface surrounding the concave surface, wherein the inwardly curved lower portion is configured to receive and direct light from the light source to the convex peripheral surface, the flat surface portion and the intermediate portion are configured to receive and direct light from the light source to the central concave surface;

wherein the inwardly curved lower portion protrudes towards the upper outer curved surface, and the inwardly curved intermediate portion protrudes towards the bottom surface.

17. The lens of claim 16, wherein an area of a projection of the concave surface on the bottom surface is equal to or greater than an area of the lower inner curved surface on the bottom surface.

\* \* \* \* \*